March 5, 1957  H. HAMRICK, JR  2,784,004
HAND TRUCK WITH FOLDABLE PLATFORM THEREON
Filed Jan. 14, 1954  2 Sheets-Sheet 2
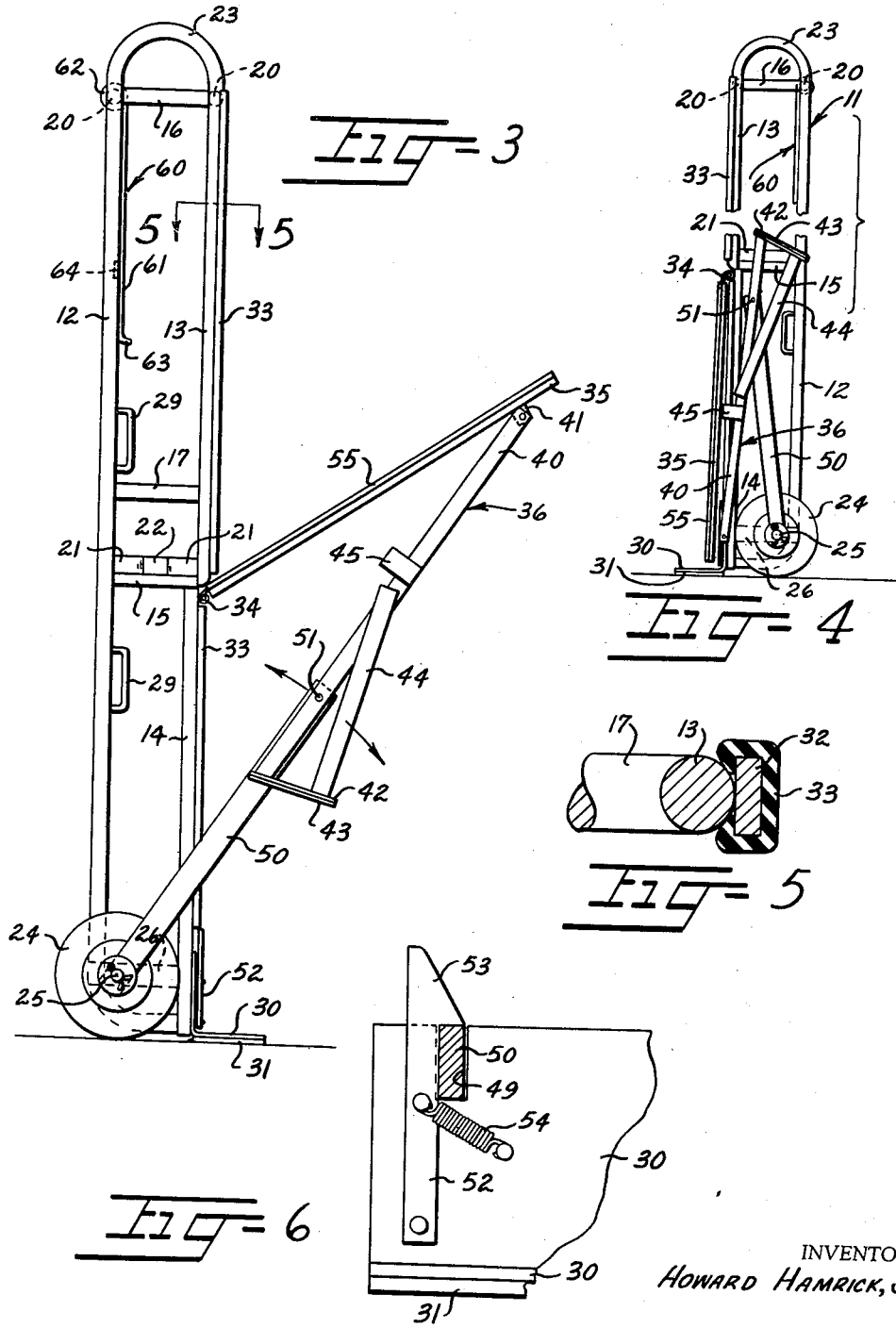
INVENTOR:
HOWARD HAMRICK, JR.
BY Eaton + Bell
ATTORNEYS.

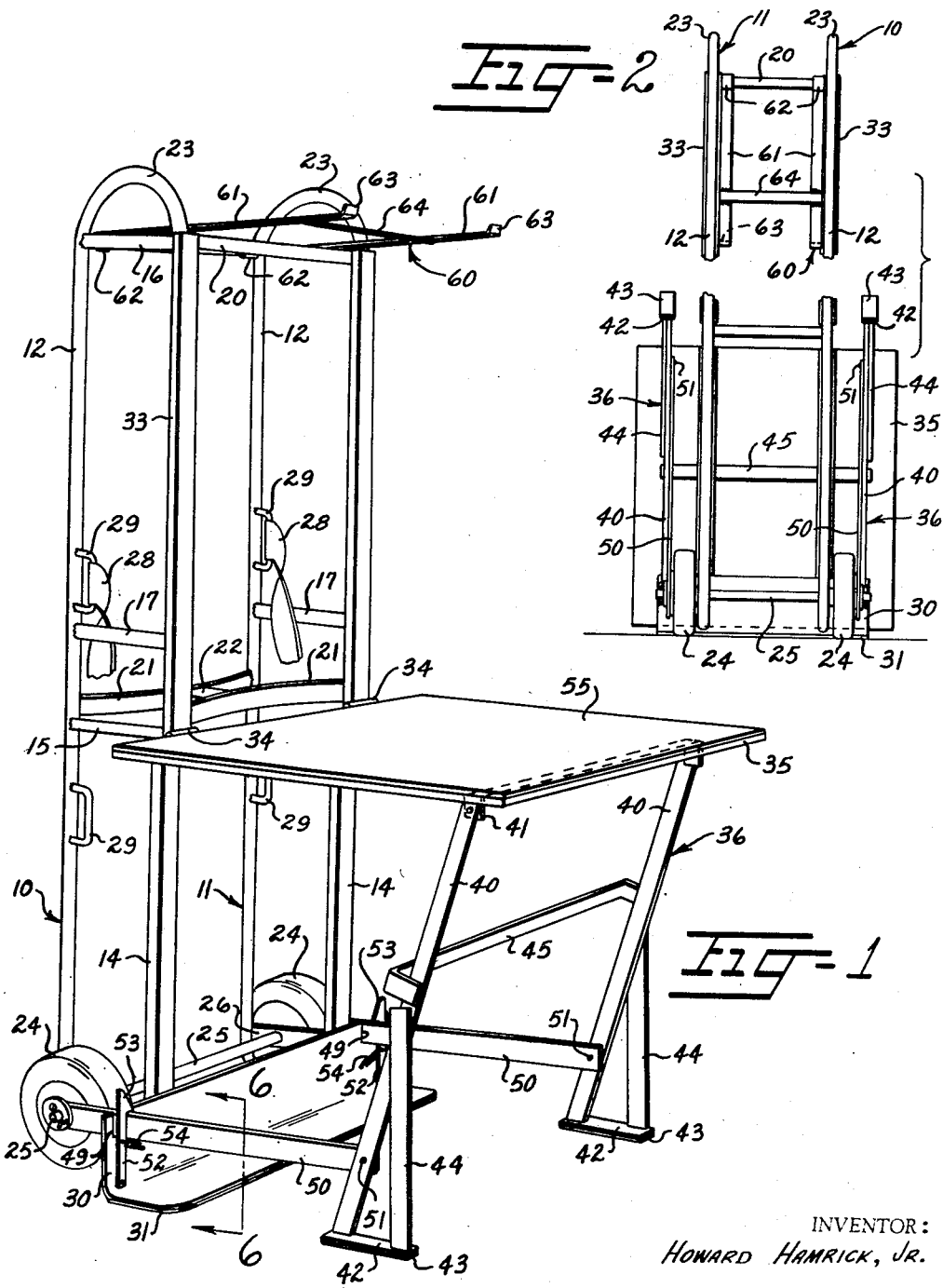

United States Patent Office 2,784,004
Patented Mar. 5, 1957

2,784,004

HAND TRUCK WITH FOLDABLE PLATFORM THEREON

Howard Hamrick, Jr., Gaffney, S. C.

Application January 14, 1954, Serial No. 404,082

3 Claims. (Cl. 280—30)

This invention relates to hand trucks of the type used for moving heavy, bulky articles, such as stoves, refrigerators, radios, television sets, etc.

It is the primary object of this invention to provide a hand truck with a rigid base plate fixed to the lower end of the truck frame, adjacent the ground wheels thereof, and a foldable platform hingedly connected to a medial portion of said frame and having a collapsible leg structure thereon so that console or floor model television sets can be supported on the base plate during transportation and servicing thereof, with the platform folded against the frame, and table model television sets can be supported and serviced or transported on the platform while the platform is in unfolded position. This obviates the necessity of an operator lifting or lowering either a table model or a floor model television set or radio in the course of moving the same from one place to another.

It is another object of this invention to provide a hand truck of the character described in which the collapsible leg structure is extended when the platform is in unfolded position and wherein the leg structure serves to maintain the platform in open or unfolded position when desired. Moreover, the leg structure cooperates with said base plate to support the platform in a horizontal position to serve as a work table in repairing table model radios or television sets.

It is still another object of this invention to provide a hand truck of the character described wherein the free end of the truck frame, i. e., the end remote from the ground wheels and base plate thereof, has a pivoted rack thereon which is normally concealed in the frame and which may be pivoted so it rests against another part of the frame in a cantilevered manner, substantially parallel to the unfolded platform, for supporting electronic testing equipment or the like while repairing or testing a radio or television set while on the platform or the base plate, as the case may be.

Some of the objects of the invention having been stated, other objects will appear when taken in connection with the accompanying drawings, in which—

Figure 1 is a perspective view of the improved hand truck showing the platform in unfolded, open or horizontal position and also showing the rack in operative position;

Figure 2 is a rear elevation of the truck showing the table in vertical or folded position;

Figure 3 is a side elevation of the truck illustrating the manner in which the platform may be extended during the movement thereof between folded and unfolded positions;

Figure 4 is a side elevation of the opposite side of the truck from that shown in Figure 3 and showing the platform in folded position against the frame;

Figure 5 is a fragmentary sectional plan view taken substantially along the line 5—5 in Figure 3;

Figure 6 is an enlarged fragmentary vertical sectional view taken substantially along the line 6—6 in Figure 1.

Referring more specifically to the drawings, the hand truck comprises a frame including a pair of inverted substantially U-shaped frame members broadly designated at 10 and 11, each of which has a rear leg 12 and a front leg 13. It will be observed that the lower ends of the front legs 13 terminate short of the lower ends of the rear legs 12 and that the lower portions of the rear legs 12 curve forwardly to form the lowermost portions of the frame members 10 and 11. A pair of longitudinally extending frame members 14 form the lower front portions of the frames 10 and 11 and their lower ends are suitably secured to the lower forwardly projecting ends of the respective rear legs 12. The members 14 may also be termed as off-set auxiliary front legs.

The upper ends of the frame members 14 are held in spaced relation to the medial portions of the rear legs 12 by bars 15 whose front ends are fixed to the lower ends of the front legs 12 and whose rear ends are fixed to the medial portions of the legs 13. The upper ends of each pair of legs 12 and 13 are spanned by a bar 16. A bar 17 spans each pair of legs 12 and 13 adjacent and above the bars 15. The frame members 10 and 11 are secured together by upper and lower laterally extending or transverse bars 20 and 21, adjacent their upper and medial portions, respectively, the bars or frame members 21 being arcuate shaped and interconnected adjacent their medial portions by a substantially rectangular member 22. The front and rear legs 12 and 13 of each of the frame members 10 and 11 are integrally interconnected at their upper ends by an arcuate member 23 which members serve as handles for manipulating the truck.

The hand truck is supported by a pair of wheels 24 rotatably mounted on opposite ends of a shaft or axle 25 fixed in bars 26 extending between and fixed to the rear legs 12 and the upright frame members 14. A substantially L-shaped member or angle base plate 30, which serves as a toe or snout for supporting large articles on the truck while transporting the same, is secured to the lower front surfaces of and spans the distance between the frame members 14. The lower surface of the horizontal portion of the base plate 30 is provided with a resilient member or surface 31 to protect the floors of homes while transporting articles therein.

The front surfaces of the legs 13 and the frame members 14 each has a relatively thin rigid bar 32 (Figure 5) thereon adapted to support a resilient covering 33 for the protection of articles carried on the hand truck. The articles to be transported by the hand truck are maintained in place and prevented from falling from the truck by means of suitable pliable straps or belts 28, portions of which are shown in Figure 1, supported by suitable hangers 29 secured to the front surfaces of the rear legs 13 of the frames 10 and 11.

One edge of a flat substantially rectangular foldable platform or table top 35 is hingedly connected, as at 34, to the upper ends of the off-set auxilary front legs 14 and the opposite edge of the table 35 is supported by means of a collapsible leg structure or linkage broadly designated at 36.

The collapsible leg structure 36 comprises a pair of legs 40 pivotally connected at their upper ends in Figures 1 and 6 to downturned end portions of a laterally extending bar 41 secured to the lower surface of the table top 35 adjacent the front edge thereof. Feet 42 extend from the lower ends of the legs 40 in angular relation thereto, the lower surfaces of said feet 42 being provided with a resilient substance or surface 43 to prevent marring of floors and the like. Suitable bracing members 44 extend upwardly from the front portions of the feet 42 and are secured at their upper ends to the medial portions of the legs 40. The legs 40 are held in spaced relationship adjacent their medial portions by a laterally extending bracing member 45 bent at right angles adjacent its opposite ends.

The collapsible structure 36 also comprises a pair of pivot arms or links 50 pivotally connected to the lower medial portions of the legs 40 in Figures 1 and 3 as at 51, and to opposite ends of the shaft 25. It will be observed that the pivot arms 50 permit the platform 35 to be folded into substantially vertical position against the frame 10, 11, or extended to substantially horizontal position or in substantially right angular relation to the frame 10, 11 of the hand truck. This is accomplished in either event by raising the table 35 to substantially the position shown in Figure 3 so the legs 40 and the pivot arms 50 extend in a substantially straight line to bring the pivot point 51 to dead center.

Then, if it is desired to fold the platform 35 against the frame 10, 11, the pivot arms 50 may be moved upwardly or inwardly in the direction of the upper arrow in Figure 3 to move the pivot point 51 upwardly beyond dead center to permit downward movement of the platform 35 and the portions of the legs 40 between the pivot points 51 and the table 35. This downward movement is continued until the edge of the table remote from the hinge 34 reaches a point adjacent the toe or snout 30 as shown in Figure 4, during which the legs 40 swing to a substantially inverted position as shown in Figure 4. It should be observed that the angularity of the bracing member 45 permits the table top 35 to be pushed inwardly to substantially parallel relationship with the members 14 without interfering with movement of the legs 40 and the pivot arms 50 past the upright frame members 14.

In a like manner, the platform 35 may be erected to the substantially horizontal position shown in Figure 1 by first elevating the same to the position shown in Figure 3 and then moving both the legs 40 and the pivot arms 50 downwardly, outwardly or forwardly to the position shown in Figure 1, at which time the feet 42 assume an attitude substantially parallel to the platform 35 for supporting the same. As the links 50 are swung to the latter position, they enter respective notches 49 in the rear or vertical leg of the angle plate 30, said angle plate extending beyond the frame 10, 11 at opposite ends thereof.

In order to insure that the platform 35 is maintained in the extended or unfolded position, there is provided a pair of longitudinally extending spring pressed latch members 52 pivotally mounted adjacent their lower ends on the rear portion of the L-shaped base plate, snout or toe 30 adjacent the notches 49. The upper end portions of the latch members 52 are adapted to engage the upper edges of the pivot arms 50 for preventing upward movement of the arms 50 when it is desired to maintain the platform 35 in extended, unfolded or horizontal position. Each of the latch members 52 is urged inwardly as by a spring or resilient member 54 secured at opposite ends to the toe or snout 30 and to the medial portion of the corresponding latch member 52.

It is to be observed in Figure 6 that the upper end of each latch 52 is beveled to form a cam surface 53 thereon which is engaged by the lower edge of the corresponding pivoted arm or link 50 as the platform is swung to open or operative position. Thus, the links 50 cause the latch members 52 to swing outwardly until the links 50 are in proper operative position. The springs 54 then cause the latch members 52 to swing inwardly and lock the links 50 in operative or extended position.

When it is desired to fold the platform 35 against the frame 10, 11, the spring pressed latch members 52 may be moved outwardly, manually, to release the links 50 so they may be swung upwardly to a point beyond dead center of the pivot point 51 at which time the platform 35 may be manipulated as heretofore described.

The platform 35 is extremely useful in its extended or horizontal position for both transporting and servicing table model radios, television sets and the like. A table model television set may be slid from the furniture or stand on which it normally rests onto the table top 35 without the necessity of lifting the heavy and cumbersome television set. In order to prevent damage to the television set, the upper surface of the table 35 is preferably provided with a suitable non-abrasive covering 55.

In order to further assist in the servicing and repair of television sets there is provided a rack 60 comprising a pair of elongated rigid strap members 61 interconnected adjacent their medial portions by a bracing member 64. Corresponding ends of the members 61 are formed in loops 62 which encircle the rearmost bar 20 between the rear legs 12 so as to permit the members 61 to rotate about said bar 20. The rack 60 normally depends from the rear lateral bar 20 and may be prevented from swinging by the means of the belts 28. When desired the rack 60 may be swung to the position shown in Figure 1. In this instance, the medial portions of the members 61 rest upon the front lateral bar 20 between the front legs 13 so the members 61 then serve as cantilever supports.

The free ends of the members 61 are bent upwardly, as at 63, to prevent forward movement of articles placed on the rack 60 such as a kit or chest having apparatus therein for servicing and repairing radios, television sets and the like.

It is thus seen that there is provided a device for transporting all types of heavy articles such as television sets in combination with a portable work bench for servicing and repairing articles such as radios, television sets and the like.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a hand truck having an elongated frame, an axle mounted in the lower rear portion of said frame and wheels journaled on opposite ends of said axle; the combination of a movable platform hingedly connected at one edge to the medial portion of said frame, a link pivotally connected to each end of said axle, a pair of laterally spaced rigidly interconnected legs pivotally connected to the opposite edge of the platform from the edge connected to said frame, means pivotally connecting the ends of the links remote from the axle to said legs at points spaced from said platform whereby said links extend in substantially parallel relation to said platform when the platform is folded down against the lower portion of said frame and raised to a position perpendicular to said frame, means carried by said frame and spaced forwardly of said axle for supporting the medial portions of said links when the platform is in extended position substantially perpendicular to said frame, spring-pressed latch means for maintaining said links in engagement with said supporting means, the ends of said legs remote from said platform extending substantially beyond the point at which they are pivotally connected to said links, and said last-named ends of the legs having feet thereon adapted to rest upon the surface on which the wheels of the truck are resting when said platform is in raised position.

2. In a hand truck having an elongated wheeled frame, the combination of a movable platform hingedly connected at one edge to the medial portion of the frame, a link pivotally connected to the lower end portion of the frame, a leg pivotally connected to the platform adjacent its edge opposite said one edge, means pivotally connecting the end of the link remote from the frame to the leg at a point spaced from the platform whereby said link extends in substantially parallel relation to the platform when the platform is folded down against the lower portion of the frame and when raised to a position perpendicular to the frame, the end of the leg remote from the platform extending substantially beyond the point at which it is pivotally connected to the link and said last named end of the leg being adapted to rest upon the surface supporting the truck when the platform is in raised position, and means carried by said frame and projecting forwardly therefrom for supporting the medial portion of the link when the platform is in extended position substantially perpendicular to the frame.

3. A structure according to claim 2 wherein spring pressed latch means are provided for maintaining the link in engagement with its supporting means.

References Cited in the file of this patent

UNITED STATES PATENTS

| | | |
|---|---|---|
| 1,460,266 | Monroe | June 26, 1923 |
| 1,718,962 | Kimball | July 2, 1929 |
| 1,948,206 | Earle et al. | Feb. 20, 1934 |
| 1,956,261 | Wagner | Apr. 24, 1934 |
| 2,212,053 | Smith | Aug. 20, 1940 |
| 2,363,619 | Prieto | Nov. 28, 1944 |
| 2,430,107 | Cronrath | Nov. 4, 1947 |
| 2,479,467 | Bryant | Aug. 16, 1949 |
| 2,483,899 | Grasso et al. | Oct. 4, 1949 |
| 2,607,606 | Millen | Aug. 19, 1952 |